United States Patent
Avgustinov et al.

(10) Patent No.: US 10,613,843 B2
(45) Date of Patent: Apr. 7, 2020

(54) COMPILER CACHING BASED ON SEMANTIC STRUCTURE

(71) Applicant: GITHUB SOFTWARE UK LTD., Oxford (GB)

(72) Inventors: Pavel Avgustinov, Oxford (GB); Julian Tibble, Oxford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/229,653

(22) Filed: Dec. 21, 2018

(65) Prior Publication Data

US 2019/0205107 A1    Jul. 4, 2019

Related U.S. Application Data

(60) Provisional application No. 62/611,674, filed on Dec. 29, 2017.

(51) Int. Cl.
*G06F 9/44*    (2018.01)
*G06F 8/41*    (2018.01)
*G06F 16/172*  (2019.01)

(52) U.S. Cl.
CPC .............. *G06F 8/433* (2013.01); *G06F 8/48* (2013.01); *G06F 16/172* (2019.01)

(58) Field of Classification Search
None
See application file for complete search history.

(56) References Cited

U.S. PATENT DOCUMENTS

| 7,765,534 | B2 * | 7/2010 | Archambault | G06F 8/4442 717/144 |
| 8,201,157 | B2 | 6/2012 | Wagner et al. | |
| 8,612,946 | B2 | 12/2013 | Salter | |
| 9,696,973 | B1 | 7/2017 | Spoon | |
| 9,760,349 | B1 | 9/2017 | Chen et al. | |
| 2016/0092183 | A1 * | 3/2016 | Radigan | G06F 8/4435 717/159 |
| 2017/0090884 | A1 | 3/2017 | Cawley | |

* cited by examiner

*Primary Examiner* — Qamrun Nahar
(74) *Attorney, Agent, or Firm* — Workman Nydegger

(57) ABSTRACT

Methods, systems, and apparatus, including computer programs encoded on computer storage media, for how a build system uses import graphs to maintain a current compilation cache and determine when compilation targets should be recompiled. A request is received to compile a compilation target. A plurality of files are identified that are used to build the compilation target. An import graph that represents import dependencies among the files used the build the compilation target is generated for the compilation target. The import graph is traversed to assign a respective identifier to each node in the import graph. A cache key is generated from data representing import relationships represented by the import graph and data representing contents of files used to build the compilation target. If the cache key is invalid or does not exist, compiling the compilation target.

20 Claims, 5 Drawing Sheets

```
File Name: HelloWorld 1 import sys
2 import iostream
3 int main()
4 {
5       print( "Hello, World.");
6 }
                                        401
```

```
File Name: Sys 1 import a
2 import b
3 int main()
4 {
5       doSomething;
6 }
                                        402
```

```
File Name: Iostream 1 import sys
2 int main()
3 {
4       doStream;
5 }
                                        403
```

```
File Name: a 1 int main()
2 {
3       doA;
4 }
                                        404
```

```
File Name: b 1 int main()
2 {
3       doB;
4 }
                                        405
```

COMPILER CACHING BASED ON SEMANTIC STRUCTURE

CROSS-REFERENCE TO RELATED APPLICATION

This application claims benefit of priority to U.S. Application No. 62/611,674, filed on Dec. 29, 2017, the entire contents of which are hereby incorporated by reference.

BACKGROUND

This specification relates to compiling source code and compiler caches.

A compiler is a computer program that converts source code files written in a programming language into an output having a target language. The target language is often machine-readable code that can be executed by a processor.

Compiling source code files is often a time-consuming process. In large build systems, time spent compiling source code often has a non-trivial impact on the throughput of the system.

A compilation cache improves compile times by maintaining information about compilation targets that have already been compiled. If the compilation cache indicates that a particular compilation target has already been generated, a build system does not need to recompile the files used to generate the compilation target. In the usual case, if the files upon which a compilation target depends have not changed since the compilation target was cached, the compilation target will have a cache hit. Conversely, if any of the files upon which a compilation target depends have been modified since the compilation target was cached the compilation target will have a cache miss, and the system will recompile the compilation target. File modifications that result in a cache miss include changes to the source code within a file as well as files being moved or renamed within a file system.

In addition, other build system events can also result in a cache miss for a particular compilation target. Some compilation caches also consider the dependency search path when determining whether there is a cache hit or miss for a particular compilation target. The dependency search path specifies in which order particular file system directories will be checked to find dependencies for a compilation target. If the dependency search path has changed for a particular compilation target, the system will have a cache miss.

SUMMARY

This specification describes technologies for how a build system can use the semantic structure of source code file dependencies to maintain a compilation cache. The semantic structure of source code file dependencies can be represented by an import graph, whose nodes and edges can be used to generate cache keys for compilation targets. The resulting cache keys are independent of the particular filenames and file paths of the source code used to compile the compilation target. Therefore, mere changes to filenames or file paths that do not actually affect the semantic structure of the import graph will not result in cache misses.

Particular embodiments of the subject matter described in this specification can be implemented so as to realize one or more of the following advantages. Using the semantic structure of source code file dependencies to generate cache keys results in a compilation cache that is resilient to program source code files that change file names or file paths. A traditional compilation cache relies on source code file paths being part of cache keys so that when the lookup path to a file changes, the compiled source code file will no longer be found in the cache. This traditional infrastructure results in the cache being sensitive to changes in file names or file paths, changes that do not actually affect the source code content of the source code files. A system thus only needs to recompile a source code file when there are changes to the file contents and not when the file merely changes its location, its name, or imports files that have had their names or locations changed. In addition, the resulting cache keys are not directly sensitive to changes in the dependency search path: Whereas a traditional system would have to force cache misses after any change to the search path, the present invention allows cached results to be re-used if the dependency search path change had no bearing on them. This turns out to be very important, since it is common to customize the dependency search path when installing a system on a new machine; it is undesirable for mere installation to invalidate the compilation cache entirely.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4A illustrates an example of a source code file and files that it directly or indirectly imports.

Like reference numbers and designations in the various drawings indicate like elements.

DETAILED DESCRIPTION

Figure 1:
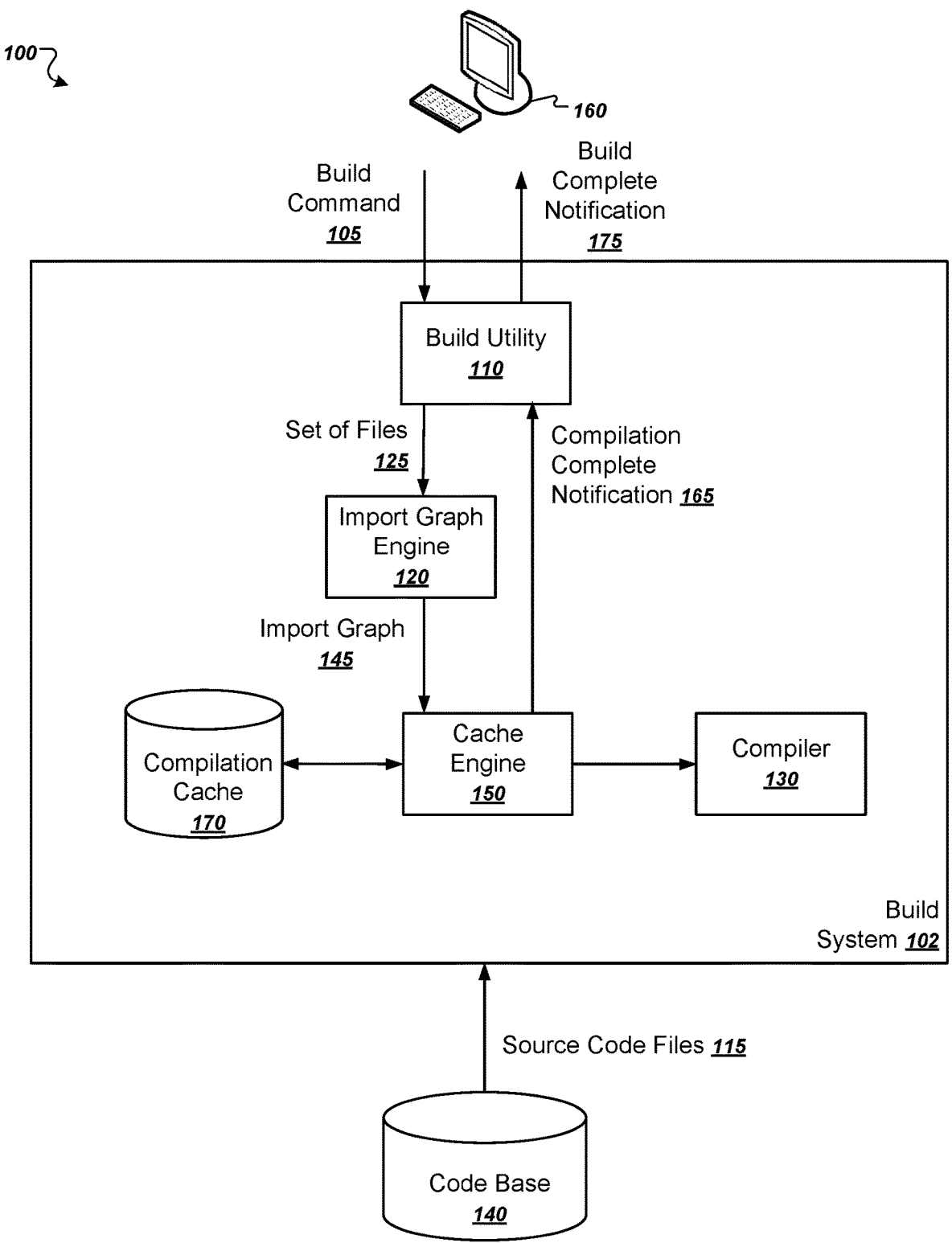
FIG. 1 is a diagram of an example system.

FIG. 1 shows an example system 100. The system 100 is an example of a system that can use import graphs 145 to maintain a compilation cache 170.

The system 100 includes a user device 160 in communication with a build system 102 over a network, which can be any appropriate communications network, e.g., a local area network or the Internet.

The build system 102 builds compilation targets using source code files 115 stored in a code base 140. Each compilation target is a file to be generated by a compiler or linker of the build system 102. Common compilation targets include executable files, object files, and library files.

The build system includes a build utility 110, a compiler 130, a cache engine 150, a compilation cache 170, and an import graph engine 120. The components of the build system 102 can be implemented as computer programs installed on one or more computers in one or more locations that are coupled to each through a network. Alternatively, the build system 102 can be installed in whole or in part on a single computing device, e.g., the user device 160.

In operation, the user device 160 provides a build command 105 to the build system 102. The build command 105 can specify one or more compilation targets to be built by the build system 102. The build command 105 is received by a build utility 110.

The build utility 110 can be any appropriate software utility for initiating builds of source code in a code base. For example, the build utility 110 can be a software utility that explicitly makes compiler calls, e.g., the "make" utility of Linux and Unix systems or a build application of an integrated development environment.

The build utility 110 can also be a software application that implicitly initiates builds by the build system 102. For example, the build utility 110 can be part of the front end of a database query engine. In that case, the build command 105 can be part of or result from a query received from the user device 160. The database query engine then implicitly compiles source code into a target executable to process the query. In other words, a user of the database front end need not explicitly specify compilation targets. Rather, a query received from a user implicitly specifies an executable to be built by the build system for processing the query.

For each compilation target specified by the build command 105, either implicitly or explicitly, the build utility 110 can generate a set of files 125 for building the compilation target.

The cache engine 150 maintains a compilation cache 170. The compilation cache 170 contains an entry for each compilation target that has already been compiled.

Each compilation action which produces a compilation target has an associated set of inputs that it will read. The compilation cache 170 is a data store that associates a cache key derived from the set of inputs (and possibly other data) of a compilation action with the resulting compiled file(s) associated with the compilation target. When re-calculating the compilation, the process looks at the current inputs and derives a fresh cache key. Then the process determines whether or not the cache key already has an entry in the compilation cache 170. If the compilation target has a valid entry, e.g., a cache hit, the system need not recompile the compilation target. If the compilation target has an invalid entry, e.g., a cache miss, the system can recompile the compilation target.

Unlike a conventional compilation cache, the system 102 computes the keys for the compilation cache 170 by using the semantic structure of file dependencies for files used to build compilation targets. Thus, the system 102 uses cache keys derived partially from the content of the files and partially from the semantic structure of file dependencies. Therefore, if the content of the files change or the semantic structure changes, the cache key will also change.

Thus, if for a given compilation target, neither the contents of the files nor the semantic structure of the file dependencies among the files associated with the compilation target have changed, there will be a cache hit and the system will not recompile the compilation target. This means that the files for a compilation target can be renamed and moved within the file system after the compilation target is compiled and cached, and the system can still have a cache hit for the compilation target.

Conversely, if the contents of any of the files associated with the compilation target have changed, the system will have a cache miss and will therefore recompile the compilation target. In some implementations, the system 102 ignores import statements when determining whether or not the contents of a file have changed. This is because if the files referenced by the import statements have merely been renamed or moved, the import statements themselves will change even though the semantic structure of the file dependencies remains the same.

To implement the compilation cache 170, The system can use an import graph engine 120 to generate import graphs 145. From the import graphs, the cache engine 150 can constructed by an import graph engine 120 to generate cache keys that do not depend on filenames or file paths. For each compilation target to be compiled, the import graph engine 120 constructs an import graph 145 that defines the import relationships among the files used to build the compilation target. Each node of the import graph represents a file and each directed edge represents that a first file represented by a source node of the edge imports a second file represented by a target node of the edge. The cache engine 150 can use import relationships of files defined by the import graph 145, along with the contents of the files associated with a compilation target, to generate a cache key.

The cache engine 150 can then search the compilation cache 170 for the generated cache key. If there is a match in the compilation cache 170, the system does not recompile the compilation target instead uses the compiled target, whose location can be identified by the compilation cache 170. If there is no match in the compilation cache 170, the system uses the compiler 130 to compile the compilation target.

The cache engine 150 can then add an entry to the compilation cache 170 corresponding to the newly compiled target. To do so, the system can store the generated cache key for the compilation target in association with a location for the compilation target and possibly other information, e.g., the set of files used to build the compilation target.

After compilation is complete and the compilation target has been cached, the cache engine 150 can provide a compilation complete notification 165 back to the build utility 110. The build utility 110 can then generate another set of files to be built or, if the build process is complete, can provide a build complete notification 175 back to the user device 160.

Figure 2:
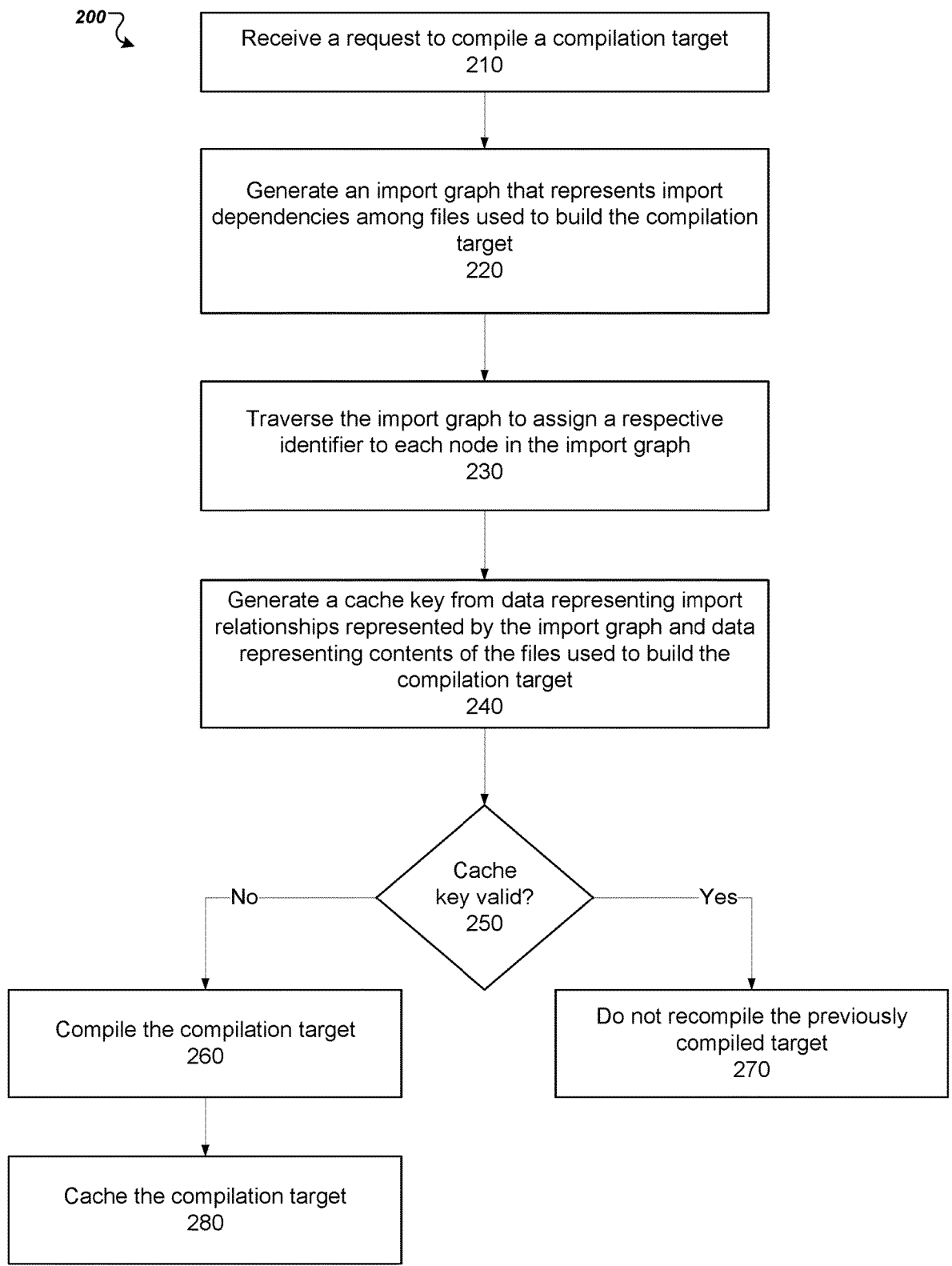
FIG. 2 is a flowchart of an example process 200 for using an import graph to cache compilation files.

FIG. 2 is a flowchart of an example process 200 for using an import graph to generate keys for a compilation cache. In general, a system uses an import graph to determine import relationships among files used to generate the compilation target. These import relationships along with the contents of the files are used to generate cache keys for the compilation cache. The process 200 can be implemented by an appropriately programmed system of one or more computers, e.g., the build system 102 of FIG. 1.

The system receives a request to compile a compilation target (210). The request can specify, either explicitly or implicitly, a set of files to be used for building the compilation target. Most build systems provide build utilities that allow developers to specify source code files used to build a particular executable file. For example, the "make" utility on Linux and Unix systems allows users to specify a target, e.g., an executable file, to be built and a set of intermediate targets, e.g., one or more object files, that must also be built to generate the target. The intermediate targets will also specify one or more source code files that need to be built to generate the intermediate target. Thus, the "make" utility can identify, for a particular executable file to be build, a set of source code files to be compiled in order to generate the executable file.

The request to compile the compilation target can also be generated implicitly by the system. For example, the system can receive, at a database front end, a user query. The system can then determine a set of source code files that are required to be compiled in order for the query to be processed.

The system generates an import graph that represents import dependencies among the files used to build the compilation target (220). An import graph is a directed graph representing the import dependencies among the files. Each node of the import graph represents a file and each edge represents an import dependency relationship between two files. Import graphs can be acyclical or cyclical.

The system traverses the import graph to assign a respective identifier to each node in the import graph (230). The system can use any appropriate graph traversal procedure to assign identifiers to the graph so long as the numbering is stable. In some implementations, the system uses a depth-first traversal to assign the identifiers.

In general, the system can ensure stable numbering by implementing a well-defined traversal order of the import graph. For example, each edge in the import graph can be labeled with a number indicating the position of the corresponding import statement within the file. An edge labeled "1" between nodes N and M would indicate that the first import statement in the file represented by N refers to the file represented by M in our graph. An edge labeled "5" between N and M2 indicates that the fifth import statement in the file represented by N refers to the file represented by M2. When traversing the graphs, the system can process edges leaving a particular node in an order defined by the labels, e.g., in increasing or decreasing order. Once there is a stable edge-processing order, stable numbering schemes can be obtained by performing either pre-order or post-order depth-first traversals or by performing pre-order or post-order breadth-first traversals.

Figure 3A:
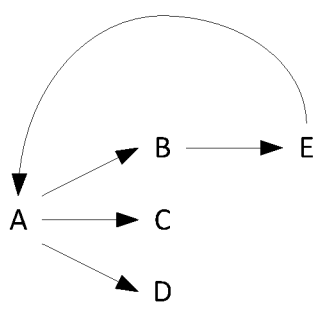
FIG. 3A illustrates an example import graph.

The system can also take steps to ensure that the traversal order is not sensitive to file renaming and similar operations. For example, the system can define the traversal order without reference to file paths or module names, which protects the resulting cache keys from being sensitive to file and module renaming operations. FIG. 3A illustrates an example import graph. In this example, a first source code file, File A, depends on files B, C, and D, in that order according to the order of the import statements in File A. File B depends on file E and File E depends on File A, thus creating a cyclical import graph. The system can perform a depth-first traversal of the import graph and assign an identifier to every unique file that the system encounters.

Figure 3B:
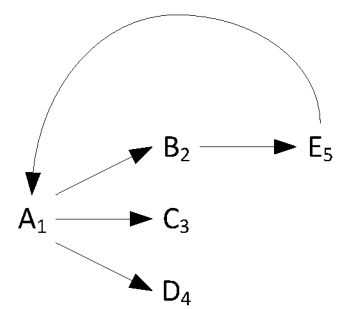
FIG. 3B illustrates the example import graph of FIG. 3A with identifiers.

FIG. 3B illustrates the example import graph of FIG. 3A with identifiers. After a depth-search traversal, File A has been assigned the identifier, 1; File B has been assigned the identifier, 2; File C has been assigned the identifier, 3; File D has been assigned the identifier, 4; and File E has been assigned the identifier, 5. When the system encounters File A for the second time during the depth-first traversal of the import files of File E, the system will not assign an identifier because File A has already been assigned an identifier.

The assigned identifiers are unique for each unique file and depend only on the structure of import graph, and do not depend on the filenames, file paths, or directory structure of the files represented in the import graph. The identifiers thus represent the structure of the import graph. Although the identifiers in this example are numbers, a system can assign any appropriate type of identifier that uniquely identifies a file. This identification of files provides stable identification for all files represented by nodes in the import graph which will not change if files are renamed or moved on disk. By generating a stable identifier of the file, even if there are slight changes in the location of the file, the file can be recognized as being the same using the stable identifier.

As shown in FIG. 2, the system generates a cache key from data representing import relationships represented by the import graph and data representing contents of the files used to build the compilation target (240). For example, the system can generate the cache key from this data by providing the data to a digester of the cache engine. The information can be concatenated and then hashed or the individual pieces can be hashed and then concatenated. Additionally or alternatively, the concatenated result can be hashed as well.

The system generates data for each node in the import graph in the order of the traversal. Thus, in some implementations the system uses the identifiers to determine in which order the nodes of the import graph should be processed to generate the cache key.

For each node in the import graph, the system sends three pieces of information to the digester: the identifier of the node, the identifiers of nodes that the node has an outgoing edge with, and the contents of the source code file that the node represents. The order in which the identifiers of the other nodes are provided to the digester can be used to preserve the order in which the import statements of each file import the other files. Thus, in implementations in which the identifiers themselves indicate this ordering, the system can simply sort the identifiers.

Each file can contain one or more: import statements and non-import statements. Import statements can specify the names and possibly the locations of other files to be imported. Thus, in order for the cache key to be robust to files being renamed and moved, the system can ignore the import statements when generating the cache key. In other words, the system can partition the file into import statements and non-import statements and provide only the contents of the non-import statements to the digester. Thereafter, if the names of the imported files change and the file is updated to include the new file names, the cache key will remain the same. At the same time, because the import graph structure is part of the cache key computation, no information is lost and the cache keys are sufficiently discriminating.

The system provides the three pieces of information to the digester for each node in the import graph to produce a data hash for the source code file. The result is a cache key that is based on the semantic structure of the import graph and the program structure of the compilation target.

The system determines whether the cache key is valid (250). In some implementations, the mere existence of the cache key in the compilation cache indicates that the cache key is valid. Some cache implementations, however, may keep invalid keys in the cache and clear only periodically clear out old cache keys.

In some other implementations, the compilation cache is actually keyed by compilation target, and the cache key is a value associated with the compilation target in the compilation cache. In order for the system to determine whether the cache key is valid, the system determines whether the value associated with the compilation cache matches the generated key. If so, the cache key is valid. If not, the cache key is invalid.

Table 3 illustrates some example cache keys generated for some of the files of FIGS. 3A and 3B.

TABLE 3

| Cache Key | Contents |
| --- | --- |
| HI85 | Location of compiled version of File A |
| G45 | Location of compiled version of File F |
| DA54 | Location of compiled version of File B |

For example, the generated cache key for File A can be "HI85." The system can search the compilation cache, such as the compilation cache illustrated in Table 3, for the cache key "HI85." If there is a match, as there is in Table 3, the contents of the cache associated with the cache key are returned. In this example, the result is the location of the compiled version of File A.

If the cache key is invalid, the system can compile the compilation target (branch to 260). The system then caches the compilation target (280). For example, the system can store the generated cache key in association with the location of the compiled target in the compilation cache.

If the cache key is valid, the system does not recompile the previously compiled target (branch to 270). In some implementations, the system uses previously compiled target, whose location the system can obtain from the entry in the compilation cache.

Figure 4B:
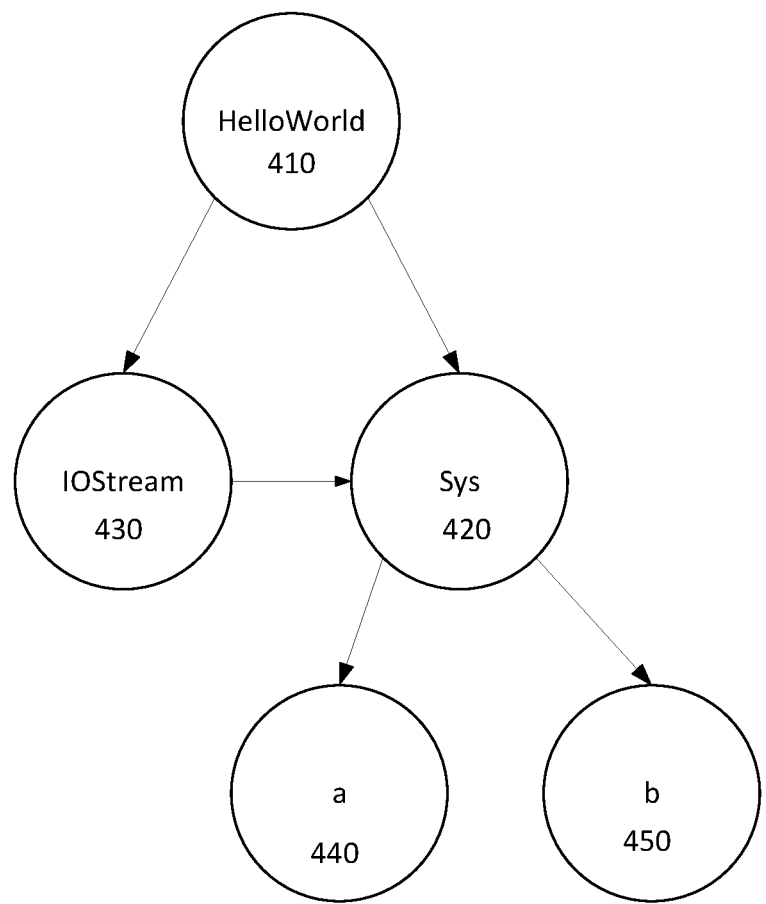
FIG. 4B illustrates the import graph for the source code file of FIG. 4A.

FIG. 4A illustrates an example of a source code file, HelloWorld, (401) and files that it directly or indirectly imports (402-405). To determine whether the source code file, HelloWorld, (401) needs to be compiled or recompiled, an example cache system first generates the import graph for the file. FIG. 3B illustrates the import graph for the source code file (401) of FIG. 4A. Each node represents a file and each edge represents and import dependency. The node (410) representing, HelloWorld (401), has edges connecting it to nodes (420, 430) representing, Sys (402) and Iostream (403) to show that HelloWorld (401) imports Sys (402) and Iostream (403) with Sys (403) being imported before Iostream (403). The node (420) representing Sys (402) has edges connecting it to nodes (440, 450) representing a (404) and b (405) respectively to show that Sys (402) imports a (404) and b (405) and the node (430) representing Iostream (403) has an edge to node (420) to show that Iostream (403) imports Sys (402). The cache system then traverses the import graph and assigns an identifier to each node in the import graph. The system generates a cache key from data representing import relationships between files represented by the nodes in the import graph and data representing contents of the files represented by the nodes in the import graph. The system uses a digester to collect the information and hash the data.

In this example, for each node in the import graph starting with the first identified node (410), the system sends three pieces of information to the digester: the identifier of the node, the identifiers and the order of the import nodes of the node, and the non-import statements of the source code file that the node represents. For HelloWorld (403), the cache system will send the node identifier (410), the list of node identifiers representing the files that HelloWorld (403) imports in the order that HelloWorld imports them, (420, 430), and the contents of HelloWorld (403). The contents of HelloWorld (403) as shown in FIG. 4A includes import statements on lines 1 and 2 and non-import statements on lines 3-5. In some implementations, the cache system will only send the non-import statements on lines 3-5 without the list of import statements because the import locations and file names may change.

Once the system has traversed the entire import graph and provided the node identifier, the list of import node identifiers in order, and the node contents for each node of the import graph, the system generates the cache key for the source code file, HelloWorld (401). The system then searches the compilation cache for a cache key that matches the generated cache key. If the system finds the cache key, the system provides the compiled version of HelloWorld (401) stored at the memory location in the compilation cache represented by the cache key. If the system does not find the cache key in the compilation cache, the system compiles HelloWorld (401), stores the compiled version of HelloWorld (401) in the compilation cache using the generated cache key as the cache key for the file, and provides the newly compiled version of HelloWorld (401).

This caching system is not sensitive to file and directory structures on disk which allows files to be moved and renamed without affecting the cache. Since the cache key is determined using stable identifiers from the import graph, the cache key is the same even after renaming or moving one or more files represented by nodes in the import graph and the compiled versions of files that have been renamed or moved can be found in the cache when there are no other changes to the files. Additionally, a developer may add a new library to the search path of the source code file without affecting the cache. If the developer adds the library to the file's search path, but does not use the library in the source code file, the cache key to the file will not change and there will still be a cache hit on the file in the compilation cache.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method comprising receiving a request to compile a compilation target; identifying a plurality of files used to build the compilation target; generating an import graph for the compilation target that represents import dependencies among the files used to build the compilation target, wherein each node of the import graph represents a file and each edge represents that a first file represented by a source node of the edge imports a second file represented by a target node of the edge; traversing the import graph to assign a respective identifier to each node in the import graph; generating a cache key from data representing import relationships represented by the import graph and data representing contents of the files used to build the compilation target; determining, from a compilation cache, whether the cache key is valid; and compiling the compilation target using the files if and only if the cache key for the compilation target is invalid or does not exist.

Embodiment 2 is the method of embodiment 1, wherein data representing contents of the files represented by the nodes in the import graph does not include import statements occurring in the files represented by the nodes in the import graph.

Embodiment 3 is the method of any one of the embodiments 1 or 2, wherein the cache key does not depend on file names of the source code file or any file names represented by nodes in the import graph.

Embodiment 4 is the method of any one of the embodiments 1 through 3, wherein the cache key does not depend on a directory structure of files represented by nodes in the import graph.

Embodiment 5 is the method of any one of the embodiments 1 through 4, further comprising: renaming or moving a source code file represented by nodes in the import graph; recomputing a cache key for the renamed or moved source code file; comparing the recomputed cache key to a previously-generated cache key for the source code file; determining that the recomputed cache key is the same as the previously-generated cache key; and providing the compiled version of the source code file from the compilation cache based on the recomputed cache key without recompiling the source code file.

Embodiment 6 is the method of any one of the embodiments 1 through 5 wherein a cache key from data representing import relationships between files represented by the nodes in the import graph and data representing contents of the files represented by the nodes in the import graph includes: (i) an identifier of the node representing the file; (ii) identifiers of any nodes representing source code files that are directly imported by the file; and (iii) a portion of the contents of the source code file.

Embodiment 7 is the method of any one of the embodiments 1 through 6 further comprising: adding the compiled received source code file to a cache of a caching infrastructure using the generated cache key as the cache key to the file.

Embodiment 8 is a system comprising one or more computers and one or more storage devices storing instructions that are operable, when executed by the one or more computers, to cause the one or more computers to perform operations comprising any of the embodiments 1 through 7.

Embodiment 9 is a computer storage medium encoded with a computer program, the program comprising instructions that are operable, when executed by data processing apparatus, to cause the data processing apparatus to perform the method of any one of claims 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving a request to compile a compilation target;
identifying a plurality of files used to build the compilation target;
generating an import graph for the compilation target that represents import dependencies among the files used to build the compilation target, wherein each node of the import graph represents a file and each edge represents that a first file represented by a source node of the edge imports a second file represented by a target node of the edge;
traversing the import graph to assign a respective identifier to each node in the import graph;
generating a cache key from data representing import relationships represented by the import graph and data representing contents of the files used to build the compilation target;
determining, from a compilation cache, whether the cache key is valid; and
compiling the compilation target using the files if and only if the cache key for the compilation target is invalid or does not exist in the compilation cache.

2. The computer-implemented method of claim 1, wherein data representing contents of the files represented by the nodes in the import graph does not include import statements occurring in the files represented by the nodes in the import graph.

3. The computer-implemented method of claim 1, wherein the cache key does not depend on file names of the files or any file names represented by nodes in the import graph.

4. The computer-implemented method of claim 1, wherein the cache key does not depend on a directory structure of files represented by nodes in the import graph.

5. The computer-implemented method of claim 1, further comprising:
renaming or moving a source code file represented by one or more nodes in the import graph;
recomputing a cache key for the renamed or moved source code file;
comparing the recomputed cache key to a previously-generated cache key for the source code file;
determining that the recomputed cache key is the same as the previously-generated cache key; and providing a compiled version of the source code file from the compilation cache based on the recomputed cache key without recompiling the source code file.

6. The computer-implemented method of claim 1, wherein a cache key from data representing import relationships between files represented by the nodes in the import graph and data representing contents of the files represented by the nodes in the import graph includes: (i) an identifier of the node representing the file; (ii) identifiers of any nodes representing source code files that are directly imported by the file; and (iii) a portion of the contents of the source code file.

7. The computer-implemented method of claim 1, further comprising:
adding a compiled received source code file to a cache of a caching infrastructure using the generated cache key as the cache key to the file.

8. A system comprising:
one or more computers and one or more storage devices storing instructions that are operable, when executed by the one or more computers, to cause the one or more computers to perform operations comprising:
receiving a request to compile a compilation target;
identifying a plurality of files used to build the compilation target;
generating an import graph for the compilation target that represents import dependencies among the files used to build the compilation target, wherein each node of the import graph represents a file and each edge represents that a first file represented by a source node of the edge imports a second file represented by a target node of the edge;
traversing the import graph to assign a respective identifier to each node in the import graph;
generating a cache key from data representing import relationships represented by the import graph and data representing contents of the files used to build the compilation target;
determining, from a compilation cache, whether the cache key is valid; and
compiling the compilation target using the files if and only if the cache key for the compilation target is invalid or does not exist in the compilation cache.

9. The system of claim 8, wherein data representing contents of the files represented by the nodes in the import graph does not include import statements occurring in the files represented by the nodes in the import graph.

10. The system of claim 8, wherein the cache key does not depend on file names of the files or any file names represented by nodes in the import graph.

11. The system of claim 8, wherein the cache key does not depend on a directory structure of the files represented by nodes in the import graph.

12. The system of claim 8, wherein the operations further comprise:
renaming or moving a source code file represented by one or more nodes in the import graph;
recomputing a cache key for the renamed or moved source code file;
comparing the recomputed cache key to a previously-generated cache key for the source code file;
determining that the recomputed cache key is the same as the previously-generated cache key; and
providing a compiled version of the source code file from the compilation cache based on the recomputed cache key without recompiling the source code file.

13. The system of claim 8, wherein a cache key from data representing import relationships between files represented by the nodes in the import graph and data representing contents of the files represented by the nodes in the import graph includes: (i) an identifier of the node representing the file; (ii) identifiers of any nodes representing source code files that are directly imported by the file; and (iii) a portion of the contents of the source code file.

14. The system of claim 8, wherein the operations further comprise:
adding a compiled received source code file to a cache of a caching infrastructure using the generated cache key as the cache key to the file.

15. One or more machine-readable hardware storage devices encoded with computer program instructions that when executed by one or more computers cause the one or more computers to perform operations comprising:
receiving a request to compile a compilation target;
identifying a plurality of files used to build the compilation target;
generating an import graph from the compilation target that represents import dependencies among the files used to build the compilation target, wherein each node of the import graph represents a file and each edge represents that a first file represented by a source node of the edge imports a second file represented by a target node of the edge;
traversing the import graph to assign a respective identifier to each node in the import graph;
generating a cache key from data representing import relationships represented by the import graph and data representing contents of the files used to build the compilation target;
determining, from a compilation cache, whether the cache key is valid; and
compiling the compilation target using the files if and only if the cache key for the compilation target is invalid or does not exist in the compilation cache.

16. The one or more machine-readable hardware storage devices of claim 15, wherein data representing contents of the files represented by the nodes in the import graph does not include import statements occurring in the files represented by the nodes in the import graph.

17. The one or more machine-readable hardware storage devices of claim 15, wherein the cache key does not depend on file names of the files or any file names represented by nodes in the import graph.

18. The one or more machine-readable hardware storage devices of claim 15, wherein the cache key does not depend on a directory structure of files represented by nodes in the import graph.

19. The one or more machine-readable hardware storage devices of claim 15, wherein the operations further comprise:
renaming or moving a source code file represented by one or more nodes in the import graph;
recomputing a cache key for the renamed or moved source code file;
comparing the recomputed cache key to a previously-generated cache key for the source code file;
determining that the recomputed cache key is the same as the previously-generated cache key; and
providing a compiled version of the source code file from the compilation cache based on the recomputed cache key without recompiling the source code file.

20. The one or more machine-readable hardware storage devices of claim 15, wherein a cache key from data representing import relationships between files represented by the nodes in the import graph and data representing contents of the files represented by the nodes in the import graph includes: (i) an identifier of the node representing the file; (ii) identifiers of any nodes representing source code files that are directly imported by the file; and (iii) a portion of the contents of the source code file.

* * * * *